Patented Jan. 14, 1941

2,228,303

UNITED STATES PATENT OFFICE 2,228,303

MONOAZO DYESTUFFS INSOLUBLE IN WATER

Ernst Fischer, Offenbach-on-the-Main, Germany, assignor to General Aniline & Film Corporation, a corporation of Delaware No Drawing. Application February 1, 1939, Serial No. 254,009. In Germany February 2, 1938

4 Claims. (Cl. 260—156)

The present invention relates to monoazo dyestuffs insoluble in water; more particularly it relates to dyestuffs of the following general formula:

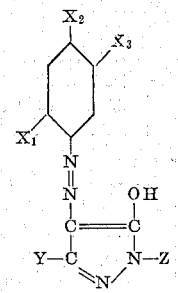

wherein $X_1$ stands for hydrogen, an alkyl-, alkoxy-, aralkoxy-, aryloxy-group or halogen, $X_2$ and $X_3$ represent hydrogen, alkyl-, alkoxy-, aralkoxy-, aryloxy-groups, halogen or one of the groups:

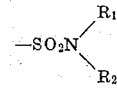

and

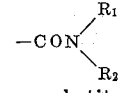

always one of the two substituents $X_2$ and $X_3$, not both simultaneously, being the group:

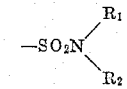

or

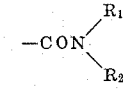

$R_1$ and $R_2$ being alkyl-, aralkyl-, aryl- or hydroaromatic radicals which may be connected in a heterocyclic ring system; Y stands for methyl, a carboxylic acid ester group or phenyl, and Z for a radical of the benzene series.

I have found that valuable pigment dyestuffs may be obtained by coupling with a 1-aryl-3-methyl-5-pyrazolone, a 1-aryl-3-aryl-5-pyrazolone, a 1-aryl-5-pyrazolone-3-carboxylic acid ester or a substitution product thereof the diazocompound from an amine of the general formula:

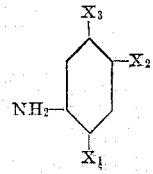

wherein $X_1$ stands for hydrogen, an alkyl-, alkoxy-, aralkoxy-, aryloxy-group or halogen, $X_2$ and $X_3$ represent hydrogen, alkyl-, alkoxy-, aralkoxy-, aryloxy-groups, halogen or one of the groups:

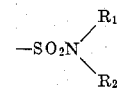

and

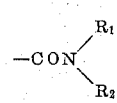

always one of the two substituents $X_2$ and $X_3$, not both simultaneously, being the group:

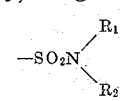

or

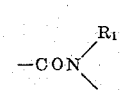

$R_1$ and $R_2$ being alkyl-, aralkyl-, aryl- or hydroaromatic radicals which may be connected in a heterocyclic ring system, only such dyestuff components being used as do not contain any group lending solubility in water, such as the sulfonic or carboxylic acid group.

The new dyestuffs yield vivid yellow and orange tints of good properties of fastness, especially of good fastness to light. They are insoluble in water, but very easily soluble in many organic solvents, such as hydrocarbons, alcohols, esters, ketones and can, therefore, be used for coloring these solvents as well as the lacquers prepared by means of these solvents, such as nitro- or acetylcellulose lacquers, films or plastic masses. They are also very suitable for coloring varnishes, candles and fats. Owing to the different substituents present in the dyestuffs, the suitability of the organic solvents named varies, but the most suitable solvents may easily be ascertained by experiment.

In comparison with the dyestuffs described in German Patents Nos. 219,846, 236,595, 236,596, 408,505, 472,355, 532,079 and French Patent No. 814,422, the dyestuffs obtainable by the invention are distinguished partly by their enhanced solubility in organic solvents, partly by their better fastness properties, such as higher fastness to light; the dyeings produced on rubber by means of the new dyestuffs bleed during the vulcanisation process to a considerably smaller extent.

The following examples serve to illustrate the invention, but they are not intended to limit it thereto:

1. 16.4 grams of 1-amino-4-ethoxybenzene-5-(sulfonyl-n-dibutylamine) are diazotized in the usual manner. In order to bind the excess of mineral acid, sodium acetate is added to the diazo-solution and the whole is then stirred into an aqueous suspension of 8.7 grams of 1-phenyl-3-methyl-5-pyrazolone prepared by dissolving this compound in dilute caustic soda solution and reprecipitating it by means of acetic acid. When the coupling is complete, the dyestuff formed is filtered with suction, washed well and dried. It is a yellow powder which easily dissolves in xylene, acetone and other organic solvents and dyes cellulose ester lacquers very vivid yellow tints of good fastness to light. The dyestuff corresponds with the following formula:

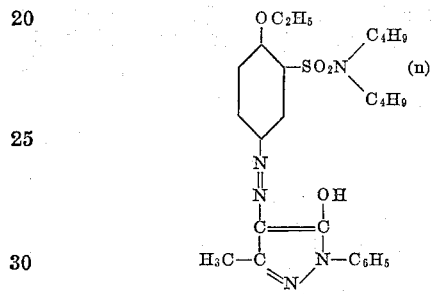

2. 15.7 grams of 1-amino-2-methoxybenzene-5-(sulfonyl-n-dibutylamine) are diazotized as usual. The diazo-solution is made neutral to Congo paper by means of sodium acetate, and then stirred into a suspension of 12.2 grams of 1-(2'.5'-dichloro)-phenyl-3-methyl-5-pyrazolone prepared by dissolving this compound in dilute caustic soda solution and reprecipitating it by means of acetic acid. The dyestuff formed is filtered with suction, washed well and dried. It dissolves easily in butyl acetate, ethyl alcohol, ethyl acetate and other organic solvents and colors lacquers vivid yellow tints of good properties of fastness.

3. If there are used, in Example 1, instead of 8.7 grams of 1-phenyl-3-methyl-5-pyrazolone, 11.6 grams of 1-phenyl-5-pyrazolone-3-carboxylic acid ethyl ester, a yellow dyestuff having similar properties is obtained; it colors the various organic solvents and the lacquers prepared by means of these solvents tints which are much more reddish than those obtainable with the dyestuff of Example 1.

4. A pigment dyestuff is prepared, in the manner described in Examples 1 and 2, from the diazo-compound of 17.2 grams of 1-amino-2.5-dimethoxybenzene-4-(sulfonyl-n-dibutylamine) and 11.6 grams of 1-phenyl-5-pyrazolone-3-carboxylic acid ethyl ester. It dissolves easily in butyl alcohol, butyl acetate and acetone and colors cellulose ester lacquers orange tints.

5. The pigment dyestuff obtainable, in the manner described in Examples 1 and 2, from the diazo-compound of 10.2 grams of 1-aminobenzene-4-(carbonyl-N-piperidine) and 8.7 grams of 1-phenyl-3-methyl-5-pyrazolone is a yellow powder, which dissolves easily in organic solvents, such as acetone, xylene, butyl acetate and the like and colors cellulose ester lacquers vivid fast tints.

6. From the diazo-compound of 11.5 grams of 1-amino-2-methoxybenzene-4-(sulfonyl-dimethylamine) and 12.8 grams of 1-phenyl-3-phenyl-5-pyrazolone there is obtained, in the manner described in Examples 1 and 2, a yellow pigment dyestuff of very good fastness to light which dissolves easily in organic solvents, such as esters, hydrocarbons and the like and colors cellulose ester lacquers vivid yellow tints.

The following table illustrates a number of other monoazo dyestuffs obtainable by the present invention which are likewise easily soluble in solvents usually applied for these purposes and have good properties of fastness.

| | Diazo-compound from— | Coupled with— | Shade |
|---|---|---|---|
| 1 | 1-amino-4-ethoxybenzene-5-(sulfonyl-diethylamine) | 1-phenyl-3-methyl-5-pyrazolone | Yellow. |
| 2 | 1-amino-4-methoxybenzene-5-(sulfonyl-n-dibutylamine) | do | Do. |
| 3 | 1-amino-2.5-dimethoxybenzene-4-(sulfonyl-n-dibutylamine) | do | Reddish-yellow. |
| 4 | 1-amino-2.5-diethoxybenzene-4-(sulfonyl-n-dibutylamine) | do | Do. |
| 5 | 1-amino-2.4-dimethoxybenzene-5-(sulfonyl-n-dibutylamine) | do | Do. |
| 6 | 1-amino-4-phenoxybenzene-5-(sulfonyl-n-dibutylamine) | do | Yellow. |
| 7 | 1-amino-2-ethoxybenzene-5-(sulfonyl-n-dibutylamine) | do | Do. |
| 8 | 1-amino-2-benzyloxybenzene-5-(sulfonyl-n-dibutylamine) | do | Do. |
| 9 | 1-amino-4-benzyloxybenzene-5-(sulfonyl-n-dibutylamine) | do | Do. |
| 10 | 1-amino-2-ethoxybenzene-5-(sulfonyl-diethylamine) | do | Do. |
| 11 | 1-amino-2-methoxybenzene-5-(sulfonyl-N-piperidine) | do | Do. |
| 12 | 1-amino-2-methoxybenzene-5-(sulfonyl-N-(n)butylaminobenzene). | do | Do. |
| 13 | 1-amino-2-methoxybenzene-5-(sulfonyl-N-ethyl-cyclohexylamine). | do | Do. |
| 14 | 1-amino-2-phenoxybenzene-5-(sulfonyl-n-dibutylamine) | do | Do. |
| 15 | 1-amino-2-methylbenzene-5-(sulfonyl-n-dibutylamine) | do | Do. |
| 16 | 1-amino-2-methylbenzene-5-(sulfonyl-N-methyl-2'-aminonaphthalene). | do | Do. |
| 17 | 1-amino-4-chlorobenzene-5-(sulfonyl-diethylamine) | do | Do. |
| 18 | 1-aminobenzene-4-(sulfonyl-diethylamine) | do | Do. |
| 19 | 1-aminobenzene-3-(sulfonyl-diethylamine) | do | Do. |
| 20 | 1-aminobenzene-4-(carbonyl-diethylamine) | do | Do. |
| 21 | 1-aminobenzene-3-(carbonyl-diethylamine) | do | Do. |
| 22 | 1-aminobenzene-3-(carbonyl-diphenylamine) | do | Do. |
| 23 | 1-amino-2-methylbenzene-5-(carbonyl-N-ethyl-1'-naphthylamine). | do | Do. |
| 24 | 1-amino-2-methoxybenzene-5-(carbonyl-diethylamine) | do | Do. |
| 25 | 1-amino-2-methoxybenzene-5-(carbonyl-N-(n)butylaminobenzene). | do | Do. |
| 26 | 1-amino-2-methylbenzene-5-(carbonyl-dicyclohexylamine) | do | Do. |
| 27 | 1-amino-4-ethoxybenzene-5-(sulfonyl-diethylamine) | 1-phenyl-5-pyrazolone-3-carboxylic acid ethyl ester | Reddish-yellow. |
| 28 | 1-amino-2-methoxybenzene-5-(sulfonyl-n-dibutylamine) | do | Do. |
| 29 | 1-amino-2-methoxybenzene-5-(sulfonyl-N-methylbenzylamine). | do | Do. |
| 30 | 1-amino-2-methoxybenzene-5-(sulfonyl-dibenzylamine) | do | Do. |
| 31 | 1-amino-2-methoxybenzene-5-(sulfonyl-diethylamine) | do | Do. |
| 32 | 1-amino-2-ethoxybenzene-5-(sulfonyl-dimethylamine) | do | Do. |
| 33 | 1-amino-2-methoxybenzene-5-(sulfonyl-N-benzylaminobenzene). | do | Do. |
| 34 | 1-amino-2-methoxybenzene-5-(carbonyl-N-carbazole) | do | Do. |
| 35 | 1-amino-2-chlorobenzene-5-(carbonyl-N-piperidine) | do | Do. |
| 36 | 1-amino-4-methoxybenzene-5-(sulfonyl-n-dibutylamine) | 1-(2'-methyl)phenyl-3-methyl-5-pyrazolone | Yellow. |

| | | Diazo-compound from— | Coupled with— | Shade |
|---|---|---|---|---|
| | 37 | 1-amino-2-methoxybenzene-5-(sulfonyl-n-dibutylamine) | 1-(4'-methyl)phenyl-3-methyl-5-pyrazolone | Yellow. |
| | 38 | 1-amino-4-methylbenzene-5-(sulfonyl-diethylamine) | ---do--- | Do. |
| | 39 | 1-amino-2.5-dimethoxybenzene-4-(sulfonyl-n-dibutylamine) | ---do--- | Reddish-yellow. |
| | 40 | 1-amino-2.5-dimethoxybenzene-4-(sulfonyl-n-dibutylamine) | 1-(2'-chloro)phenyl-3-methyl-5-pyrazolone | Do. |
| | 41 | 1-amino-2-methylbenzene-5-(sulfonyl-diethylamine) | ---do--- | Yellow. |
| | 42 | 1-aminobenzene-4-(carbonyl-diethylamine) | ---do--- | Do. |
| | 43 | 1-amino-2.5-dimethoxybenzene-4-(sulfonyl-n-dibutyamine) | 1-(4'-chloro)-phenyl-3-methyl-5-pyrazolone | Reddish-yellow. |
| | 44 | 1-amino-4-ethoxybenzene-5-(sulfonyl-n-dibutylamine) | 1-(2'.5'-dichloro)-phenyl-3-methyl-5-pyrazolone | Yellow. |
| | 45 | 1-amino-2-methoxybenzene-5-(sulfonyl-diethylamine) | ---do--- | Do. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble monoazo dyestuffs of the following general formula:

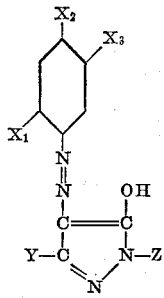

wherein $X_1$ stands for a member of the group consisting of hydrogen, alkyl, alkoxy, benzyloxy, phenoxy and halogen, $X_2$ and $X_3$ stand for members of the group consisting of hydrogen, alkyl, alkoxy, benzyloxy, phenoxy, halogen, the group

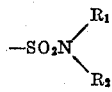

and the group

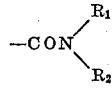

always one of the two substituents $X_2$ and $X_3$, not both simultaneously, being one of the groups

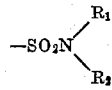

and

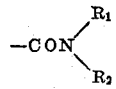

$R_1$ and $R_2$ being members of the group consisting of alkyl, benzyl, radicals of the benzene and naphthalene series and hydroaromatic radicals, which may be connected in a heterocyclic ring system, Y stands for a member of the group consisting of methyl, carboxylic acid ester and phenyl, and Z for a radical of the benzene series, being insoluble in water, but very easily soluble in organic solvents and yielding vivid yellow and orange tints of good properties of fastness, especially of good fastness to light.

2. The water-insoluble monoazo dyestuff of the following formula:

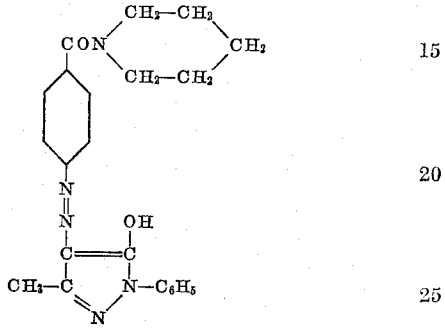

being a yellow powder which dissolves easily in organic solvents, such as acetone, xylene, butyl acetate, butyl alcohol and colors, for instance, cellulose ester lacquers vivid fast tints.

3. The water-insoluble monoazo dyestuff of the following formula:

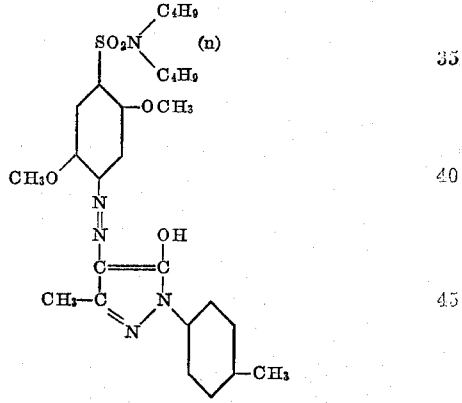

being a yellow powder which dissolves easily in organic solvents, such as acetone, xylene, butyl acetate, butyl alcohol and colors, for instance, cellulose ester lacquers vivid reddish-yellow tints.

4. The water-insoluble monoazo dyestuff of the formula:

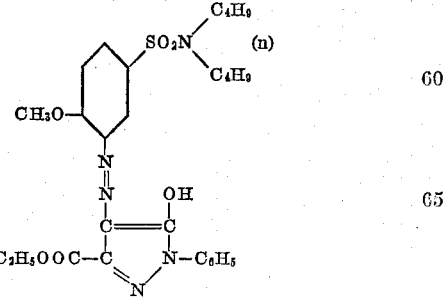

being a yellow powder which dissolves easily in organic solvents, such as acetone, xylene, butyl acetate, butyl alcohol, and colors, for instance, cellulose ester lacquers vivid reddish-yellow tints.

ERNST FISCHER.